United States Patent [19]

Scott et al.

[11] Patent Number: 5,647,194
[45] Date of Patent: Jul. 15, 1997

[54] ELASTOMER CLOSURE SPRING

[75] Inventors: Phillip Ray Scott; Marty Dean Youman, both of Madera, Calif.

[73] Assignee: FMC Corporation, Chicago, Ill.

[21] Appl. No.: 547,855

[22] Filed: Oct. 25, 1995

[51] Int. Cl.⁶ .................................................. A01D 46/00
[52] U.S. Cl. ................. 56/328.1; 56/329; 56/330
[58] Field of Search ..................... 56/327.1, 328.1, 56/330, 329, 340.1

[56] References Cited

U.S. PATENT DOCUMENTS

| 3,667,797 | 6/1972 | Kilby | 56/340.1 X |
|---|---|---|---|
| 3,696,597 | 10/1972 | Sitter | 56/340.1 |
| 3,771,301 | 11/1973 | Favor | 56/328.1 |
| 3,866,401 | 2/1975 | Claxton et al. | 56/330 |
| 4,984,421 | 1/1991 | Dreux | 56/328.1 |
| 5,101,618 | 4/1992 | Oldridge | 56/330 |
| 5,109,657 | 5/1992 | DeVries | 56/330 |
| 5,181,373 | 1/1993 | Littau | 56/330 X |
| 5,341,630 | 8/1994 | Littau | 56/330 |

*Primary Examiner*—Dave W. Arola
*Assistant Examiner*—Robert Pezzuto
*Attorney, Agent, or Firm*—Michael B. K. Lee; Douglas W. Rudy

[57] ABSTRACT

A harvester for harvesting grapes or other fruits from plants. The harvester uses elastomer spring to support the closure wings of the harvester. The elastomeric spring may be a block of elastomeric material connecting a closure plate to the frame of the harvester. The elastomeric spring allows movement of the closure plate in many different directions. In addition, the elastomeric spring has fewer parts and is easier to assemble than conventional spring systems.

18 Claims, 3 Drawing Sheets

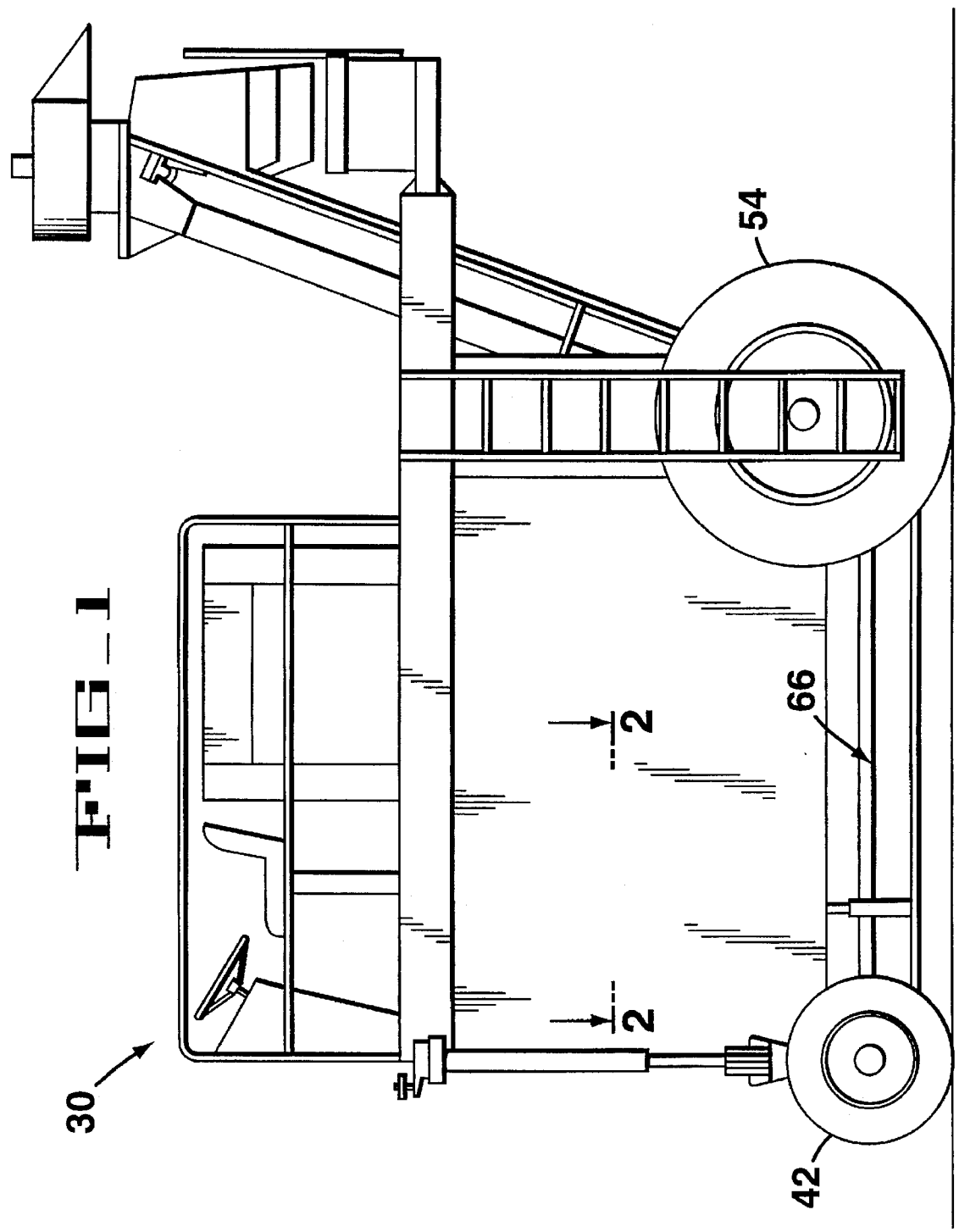

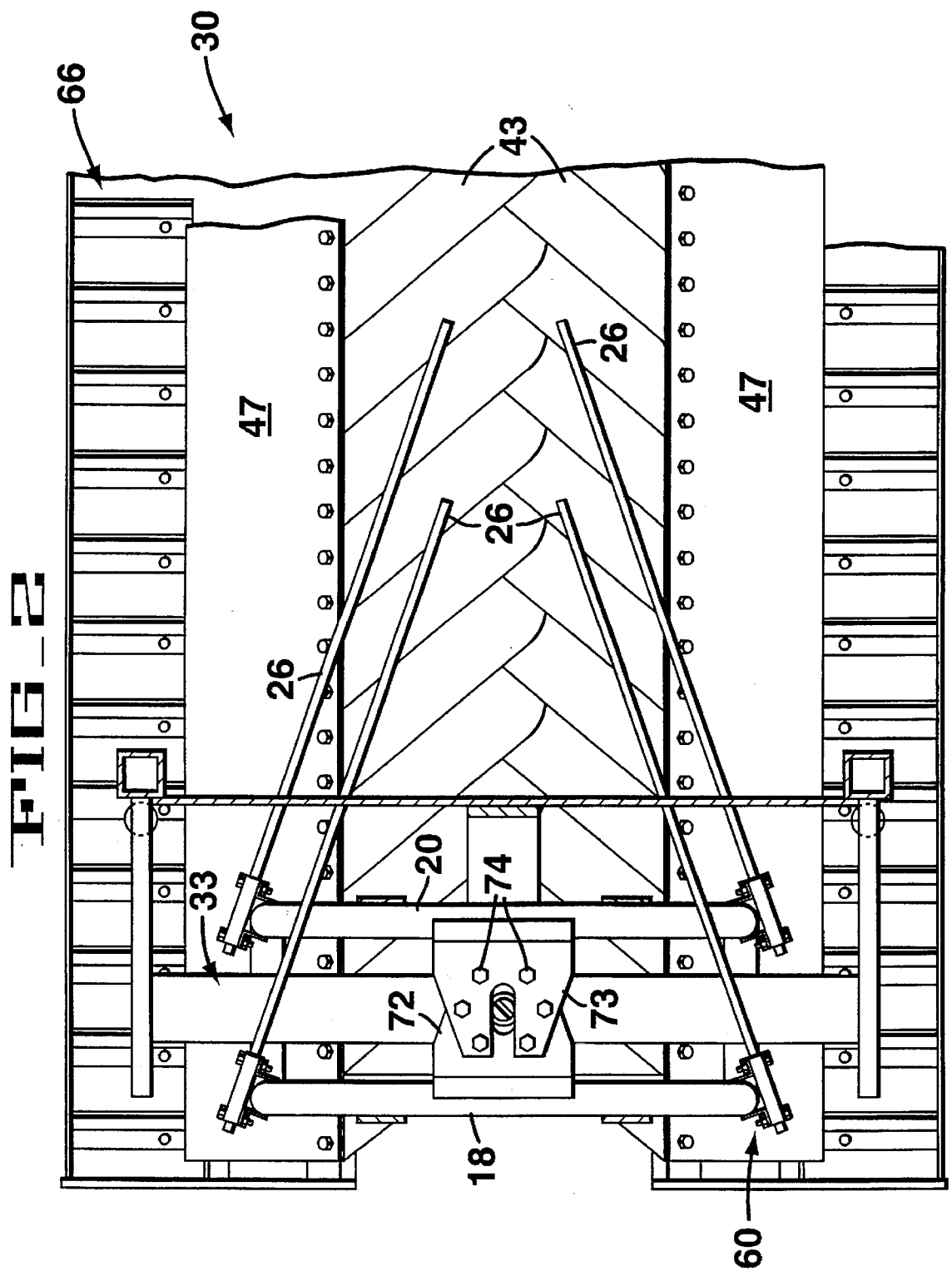

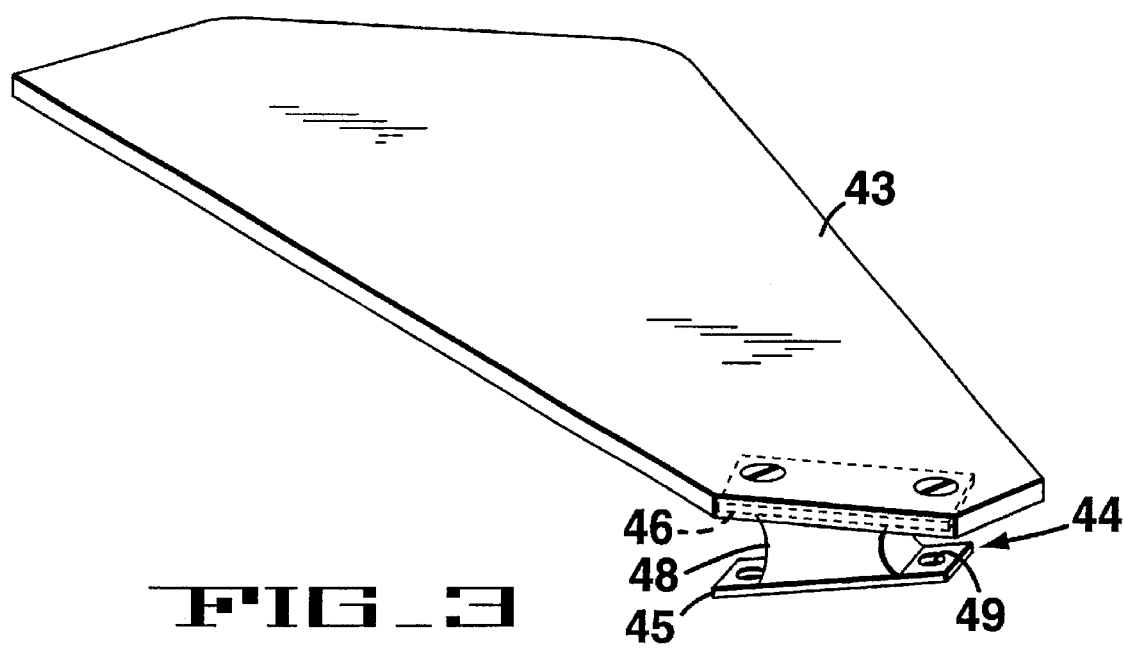
FIG_3
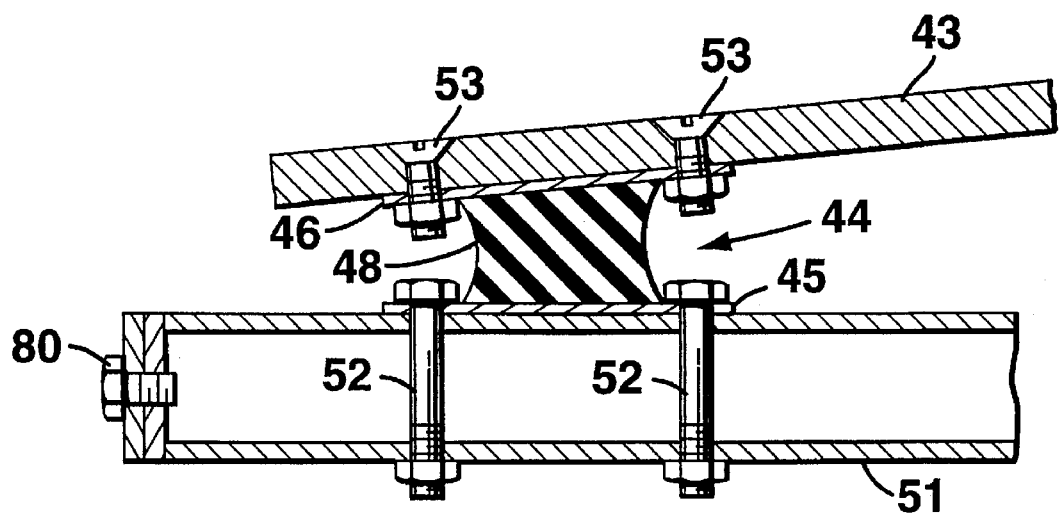
FIG_4

ELASTOMER CLOSURE SPRING

BACKGROUND OF THE INVENTION

The present invention relates to mobile harvesters such as grape and raisin harvesters. In the past, metallic springs were used to provide a spring force for closure plates used on such harvesters.

SUMMARY OF THE INVENTION

The inventive harvester uses elastomeric material to provide a spring force for closure plates.

BRIEF DESCRIPTION OF THE DRAWINGS

FIG. 1 is a side view of an inventive harvester.

FIG. 2 is a cut away top view of the inventive harvester shown in FIG. 1 along lines 2—2.

FIG. 3 is a perspective view of the enclosure plate and spring, used in the harvester of FIG. 1.

FIG. 4 is a cross-sectional view of the enclosure plate mounted on a rail of the harvester.

DESCRIPTION OF THE PREFERRED EMBODIMENTS

Having reference to the harvester 30 FIGS. 1 and 2 of the present invention illustrating a harvester frame 33 and means for removing fruit such as berries from plants.

In the preferred embodiment illustrated in FIGS. 1 through 4 the means for removing 60 comprises a first U-shape yoke 18 and a second U-shape yoke 20. A first horizontal collar 72 is welded to the first U-shape yoke 18. A second horizontal collar 73 is welded to the second U-shape yoke 20. The first horizontal collar 72 and second horizontal collar 73 are bolted to a force balanced shaker or some other shaking means by bolts 74. A plurality of rods 26 are mechanically connected to each U-shaped yoke 18, 20.

Below the rods 26 are two rows of a plurality of closure wings 43. The location between the two rows of closure wings 43 is defined as the center of the harvester 30. The closure wings 43 are flat and angled. A first side of a catching plate 47 is adjacent to the closure wings 43, and a second side of the catching plate 47 ends above a conveyor 66. In the preferred embodiment, the catching plates are pivoted by a plant passing through the machine.

FIG. 3, illustrates a perspective view of a closure wing 43 and a elastomer closure spring 44. The elastomer closure spring 44 comprises an elastomer block 48, bonded to a first mounting plate 45 and a second mounting plate 46. The first plate mounting 45 and the second mounting plate 46 each have a plurality of bolt holes 49 to provide a means for mounting.

FIG. 4, is a cross sectional view of the enclosure plate 43 and the elastomer closure spring 44 mounted on a rail 51 forming part of the harvester frame 33. First mounting bolts 52 are used to mechanically connect the first mounting plate 45 to the rail 51. Second mounting bolts 53 are used to mechanically connect the second mounting plate 46 to the closure wing 43. The elastomer block 48 bonded between the first mounting plate 45 and the second mounting plate 46 is concave as shown. In addition, the side of the elastomeric block 48 bonded to the first mounting plate 45 is angled with respect to the side of the elastomeric block 48 bonded to the second mounting plate 46, so that the first mounting plate 45 is angled with respect to the second mounting plate 46. This angled relationship, provides a desired angled relationship between the closure wing 43 and the rail 51, without requiring shims to provide such an angle. The casting of the elastomer block 48 can provide any desired angle. The elastomer block 48 provides elastic movement in many directions, instead of in the single direction provided by a metal spring and pivot. The design is symmetrical so that there is no left or right, no top or bottom; only a front and back. Since each closure wing 43 has a elastomeric closure spring 44, for each harvester 30 there are a plurality of elastomeric closure springs 44, requiring a plurality of first mounting plates 45, a plurality of second mounting plates 46, and a plurality of elastomeric blocks 48, wherein each elastomeric block 48 is bonded between a first mounting plate 45 and a second mounting plate 46.

In operation, an operator steers the harvester 30, so that grape or other plants to be harvested are placed between the closure wings 43. As the plant enters between the two rows of closure wings 43 the elastomer closure springs 44 flex allowing the plant to pass between the two rows of closure wings 43. The means for harvesting 60 causes fruit, such as grapes or berries, to dislodge from the plant and fall to the closure wings 43 and catching plates 47 below. The angle of the closure wings 43 cause the fruit to slide to the conveyors 66, which transport the fruit to a storage means.

The elastomer block may be rubber or any rubber like plastic. The elastomer block may be in the shape of a rectangular block or other shapes such as a concave block as shown in FIGS. 3 and 4 to minimize force at the corners.

In an embodiment of the invention, the bolts 80 holding the rails 51 may provide a means for adjusting the angle of the rails 51, which adjust the angle of the closure wings 43 according to use.

Some of the advantages of the elastomer closure spring over some prior art metal torsion springs are as follows: Metal torsion springs require several parts and require considerable assembly time. The elastomer closure spring may be made as a single piece. Many metal torsion springs allow only one axis of movement, whereas the elastomer closure spring may move in many directions. Many metal torsion springs break when subjected to sufficient forces that are not along the direction of movement, such as when the harvester rolls back a short distance or hits a bump. An elastomer closure spring is able to handle such forces in different directions. Metal torsion springs are difficult to manufacture with consistent spring characteristics and shape. Elastomer closure springs are easier to manufacture in consistent spring characteristics and shape. Because of the many parts and difficult assembly, metal torsion springs have a high yearly maintenance for replacing various parts that need to be replaced each season. Metal torsion springs have a top and bottom and also a left and right, meaning they are not completely interchangeable, thus making assembly more tedious. Elastomer closure springs may be made completely interchangeable. The mounting plates of metal torsion springs normally need to be parallel, requiring a shim to provide a connection between non-parallel surfaces, although sometimes the metal mounting plates are welded at the angle needed. The mounting plates of an elastomer closure spring may be easily made non-parallel to provide a built in angle without shims.

This closure system may also be used on the outer side of a harvester which harvests on only one side at a time.

Although the best mode contemplated for carrying out the present invention has been herein shown and described, it will be understood that modification and variation may be made without departing from what is regarded to be the subject matter of the invention.

What is claimed is:

1. An apparatus for harvesting fruits from plants, comprising:

a frame;

means for removing fruits from the plants supported by the frame;

a first plurality of mounting plates mechanically connected to the frame;

a second plurality of mounting plates;

a plurality of elastomer blocks bonded between a mounting plate of the first plurality of mounting plates and a mounting plate of the second plurality of mounting plates; and a plurality of closure wings, wherein each closure wing of the plurality of closure wings is mechanically connected to a mounting plate of the second plurality of mounting plates.

2. The apparatus, as recited in claim 1, wherein the elastomer blocks are made of rubber.

3. The apparatus, as recited in claim 2, wherein the elastomer blocks are in the shape of rectangular blocks.

4. The apparatus, as recited in claim 2, wherein the elastomer blocks are in the shape of concave blocks.

5. The apparatus, as recited in claim 1, further comprising means for conveying fruit from the plurality of closure wings, supported by the frame.

6. An apparatus for catching fruit falling from plants, comprising:

a first row of closure wings;

a first rail for positioning along a first side of the plants;

a first plurality of mounting plates mechanically connected to the first rail;

a second plurality of mounting plates, wherein each mounting plate of the second plurality of mounting plates is mechanically connected to a closure wing of the first row of closure wings; and a first plurality of elastomer blocks, wherein each elastomer block of the first plurality of elastomer blocks is bonded between a mounting plate of the first plurality of mounting plates and a mounting plate of the second plurality of mounting plates.

7. The apparatus, as recited in claim 6, further comprising:

a second row of closure wings;

a second rail for positioning along a second side of the plants;

a third plurality of mounting plates mechanically connected to the second rail;

a fourth plurality of mounting plates, wherein each mounting plate of the fourth plurality of mounting plates is mechanically connected to a closure wing of the second row of closure wings; and a second plurality of elastomer blocks, wherein each elastomer block of the second plurality of elastomer blocks is bonded between a mounting plate of the third plurality of mounting plates and a mounting plate of the fourth plurality of mounting plates.

8. The apparatus, as claimed in claim 7, further comprising:

means for adjusting the angle of the first rail; and means for adjusting the angle of the second rail.

9. The apparatus, as recited in claim 8, wherein the first plurality and second plurality of elastomer blocks are made of rubber.

10. The apparatus, as recited in claim 9, wherein the first plurality and second plurality of elastomer blocks are in the shape of rectangular blocks.

11. The apparatus, as recited in claim 9, wherein the first plurality and second plurality of elastomer blocks are in the shape of concave blocks.

12. The apparatus, as recited in claim 7, wherein the first plurality and second plurality of elastomer blocks are made of rubber.

13. The apparatus, as recited in claim 12, wherein the first plurality and second plurality of elastomer blocks are in the shape of rectangular blocks.

14. The apparatus, as recited in claim 12, wherein the first plurality and second plurality of elastomer blocks are in the shape of concave blocks.

15. The apparatus, as recited in claim 6, wherein the first plurality of elastomer blocks are made of rubber.

16. The apparatus, as recited in claim 15, wherein the first plurality of elastomer blocks are in the shape of rectangular blocks.

17. The apparatus, as recited in claim 15, wherein the first plurality of elastomer blocks are in the shape of concave blocks.

18. The apparatus, as recited in claim 6, further comprising means for conveying fruit from the first row of closure wings.

* * * * *